(12) United States Patent
Jang et al.

(10) Patent No.: US 8,382,961 B2
(45) Date of Patent: Feb. 26, 2013

(54) SYSTEM AND METHOD FOR REDUCTION OF WATER CONSUMPTION IN PURIFIED TEREPHTHALIC ACID PRODUCTION

(75) Inventors: Ji-Young Jang, McKinney, TX (US); Kuang-Yeu Wu, Plano, TX (US); Ming-Mou Yang, Kaohsiung (TW)

(73) Assignee: AMT International, Inc., Plano, TX (US)

( * ) Notice: Subject to any disclaimer, the term of this patent is extended or adjusted under 35 U.S.C. 154(b) by 353 days.

(21) Appl. No.: 12/801,385

(22) Filed: Jun. 7, 2010

(65) Prior Publication Data

US 2011/0297528 A1 Dec. 8, 2011

(51) Int. Cl.
*B01D 11/00* (2006.01)

(52) U.S. Cl. ............... 203/43; 203/46; 203/57; 203/98; 159/DIG. 9; 562/608

(58) Field of Classification Search .......... 562/607–608; 203/12, 14–16, 29, 34, 39, 42–46, 50–70, 203/84, 98; 202/154, 158–162, 168–170; 159/DIG. 9
See application file for complete search history.

(56) References Cited

U.S. PATENT DOCUMENTS

| | | | | |
|---|---|---|---|---|
| 5,175,357 A | * | 12/1992 | Van Brunt | 562/513 |
| 5,490,579 A | * | 2/1996 | Ratcliffe et al. | 187/266 |
| 5,492,603 A | * | 2/1996 | Gualy et al. | 202/158 |
| 5,980,696 A | * | 11/1999 | Parten et al. | 203/1 |
| 7,048,835 B2 | * | 5/2006 | Jang et al. | 203/16 |
| 8,268,131 B2 | * | 9/2012 | Jang et al. | 202/154 |
| 2003/0150706 A1 | * | 8/2003 | Jang et al. | 203/14 |
| 2004/0249207 A1 | * | 12/2004 | Lin et al. | 562/600 |
| 2004/0249208 A1 | * | 12/2004 | Lin et al. | 562/600 |
| 2006/0235242 A1 | * | 10/2006 | Kang | 562/410 |
| 2007/0068792 A1 | * | 3/2007 | Jang et al. | 203/14 |

* cited by examiner

*Primary Examiner* — Duane Smith
*Assistant Examiner* — Thomas McKenzie
(74) *Attorney, Agent, or Firm* — George A. Seaby

(57) ABSTRACT

The invention disclosed is an apparatus and method for the recovery of acetic acid, azeotropic agent, extraction agent, re-usable water and other reaction products such as p-toluic acid, from an aqueous stream generated during a terephthalic acid production process, having superior energy efficiency and reduced water consumption. The apparatus of the invention includes: an azeotropic distillation column to remove water from acetic acid, a pair of mother liquor extraction columns sequentially connected in series for primary recovery of extraction solvent and other organics, an azeotropic agent stripper for recovery of azeotropic agent and a post-separation solvent stripper distillation column for further separation of the aqueous bottoms stream from said extraction columns into a volatiles stream comprising mainly organics with a very low amount of water and a liquid stream comprising water containing very low amounts of organics, each stream being sufficiently pure that it can be recycled for reuse in the purification of crude terephthalic acid.

15 Claims, 5 Drawing Sheets

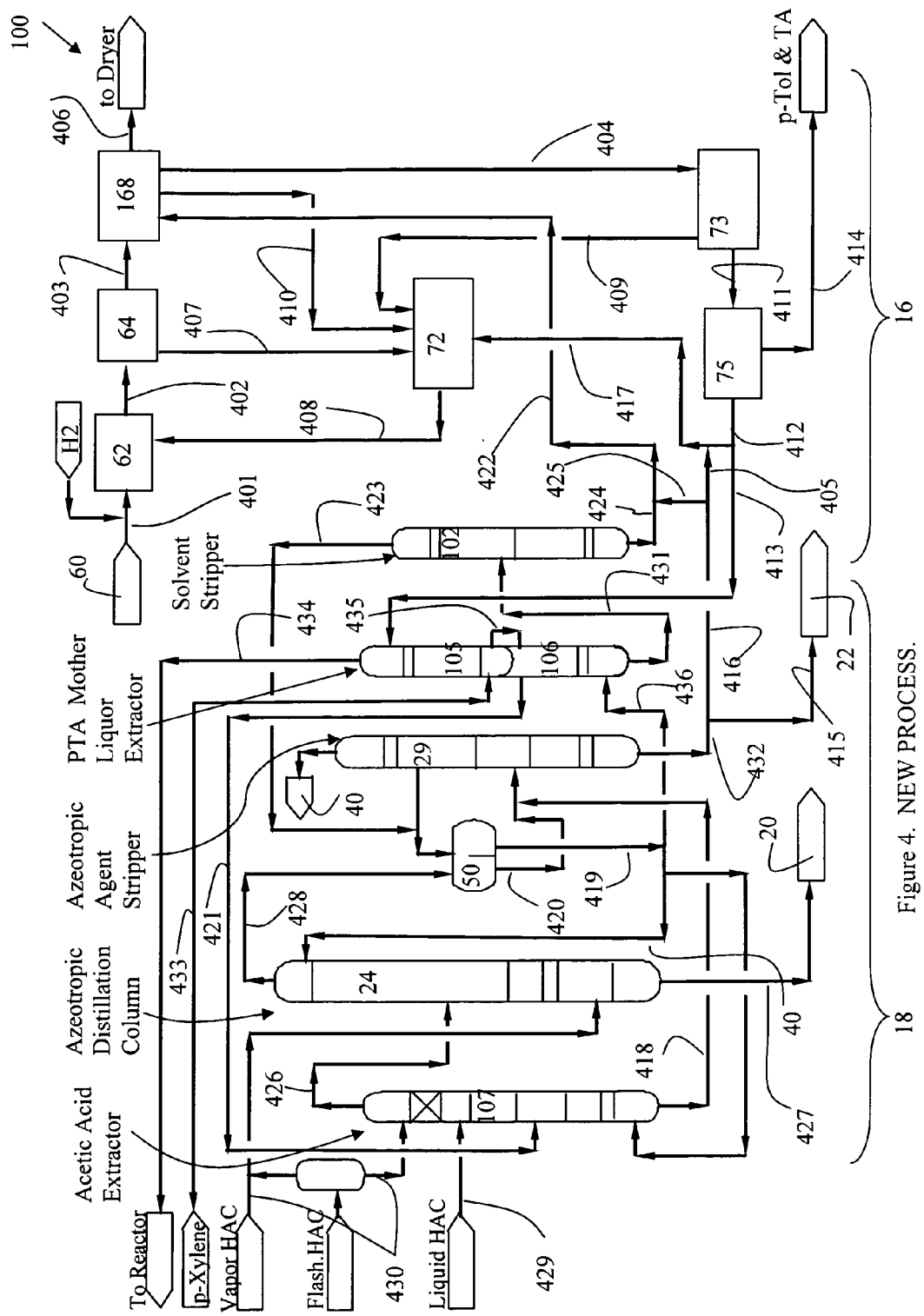
Figure 4. NEW PROCESS.

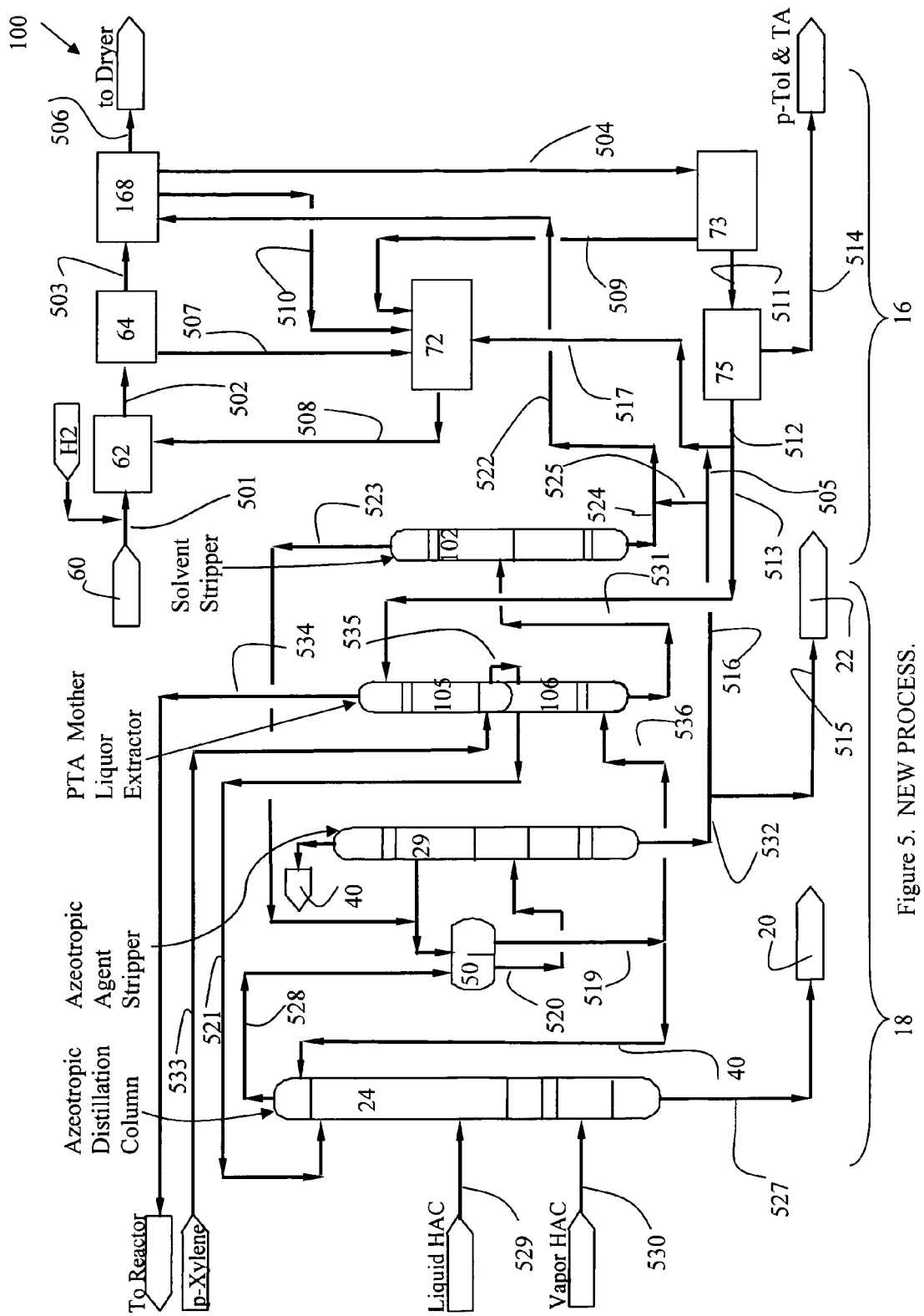
Figure 5. NEW PROCESS.

SYSTEM AND METHOD FOR REDUCTION OF WATER CONSUMPTION IN PURIFIED TEREPHTHALIC ACID PRODUCTION

BACKGROUND OF THE INVENTION

The invention relates generally to reduction of water consumption and improved energy efficiency in chemical processes used in the distillation of industrial chemicals, and in particular is suitable-for reduction of water consumption in the production of purified terephthalic acid.

Terephthalic acid is useful in a diverse variety of industrial applications and chemical processes. For example, terephthalic acid is a starting material for producing polyesters including plastic and Dacron™ polyester used in textile and container production. Polyethylene terephthalate (PET) is a form of polyester or Mylar™ that is an extremely tough resin and useful in many industrial and consumer applications. Soft drink and water bottles are made from this resin in addition to plastic jars and clamshell packages used in consumer good transport and food distribution. Purified terephthalic acid is a higher grade of terephthalic acid which is used for finer industrial applications.

Terephthalic acid typically is produced by reaction of par-axylene with molecular oxygen in the presence of a catalyst. During the production process, acetic acid is used as a solvent of terephthalic acid. The acetic acid becomes diluted in water during the oxidation in a reactor section of a terephthalic acid plant in the production cycle. A portion of the acetic acid and water containing stream is then sent to a dehydration unit to recover acetic acid for recycle back to the reactor and to remove the water generated in the reactor for use in the pressure filter or waste treatment.

Various different approaches have been employed in the terephthalic acid plants to separate the acetic acid and water. Typically, in prior art systems both make up water and water generated by the reaction ultimately are sent to a wastewater treatment facility for safe disposal.

One approach for separation of water and acetic acid is by conventional distillation based on the differences in boiling point of the components. Distillation has been widely used as a primary unit operation for acetic acid recovery from water. In such processes, one or more towers are utilized to process a number of streams of varying concentrations of acetic acid. However, the distillation of acetic acid and water is very inefficient (i.e. energy intensive) due to the close-boiling characteristics of the acetic acid/water system.

There has been an effort to look for alternative processes to minimize the high operating costs associated with the conventional distillation for the separation of acetic acid and water. Chemical processors and companies have resorted to azeotropic distillation involving the addition of selective alkyl acetate, such as isobutyl acetate, normal butyl acetate, normal propyl acetate, etc., as a solvent to the azeotropic dehydration column.

Another approach is azeotropic distillation where extraction solvents (also termed entrainers) are used to form azeotropes with the acetic acid and water providing a change in energy requirements for processing.

More specifically, the solvent forms a low boiling azeotrope with water and therefore improves the relative volatility for the separation between the acetic acid containing stream and the alkyl acetate/water azeotrope. This reduces the energy and theoretical stage requirements for the same separation. Compared to the conventional distillation, an azeotropic distillation approach typically reduces the energy (i.e. steam) consumption by 20-40% at the acetic acid/water dehydration column while giving relatively low acetic acid concentration, 300-800 ppm, in the distilled water. The azeotropic distillation column is generally employed in the terephthalic acid manufacturing plants in all prior art systems. However, the effluent water stream is not sufficiently clean for use in the terephthalic acid purification unit, and so the water is sent for disposal with the organics contained therein.

A combination of liquid-liquid extraction with azeotropic distillation is yet another approach for acetic acid and water separation. In particular, a method used in terephthalic acid production includes the use of liquid-liquid extraction with an extraction solvent into which acetic acid is extracted thus substantially reducing the concentration of acetic acid in the aqueous stream. Typically, the extraction solvent is selected from a group of isobutyl acetate, normal butyl acetate, isopropyl acetate and normal butyl acetate. The resulting extract comprises mainly the solvent and acetic acid, and also contains a lesser amount of water, and so this stream is easier to separate in an azeotropic distillation column. An azeotropic mixture comprising water and an ester that is also the extraction solvent is distilled from the top of the azeotropic distillation column, and an acetic acid rich liquid stream is recovered from the bottom of said azeotropic distillation column.

Such extraction and azeotropic distillation processes for recovery of acetic acid from aqueous streams are described by, for example, Othmer in U.S. Pat. No. 2,395,010 (1946) and Sasaki et al. in U.S. Pat. No. 5,662,780 (1997), and have been applied to recovery of acetic acid from manufacture of terephthalic acid as described, for example, by Ohkoshi et al. in Japanese Patent Application JP 244196/95 (1995) and European Patent Application EP 0 764 627 (1995).

More specifically, Ohkoshi et al. in European Patent Application EP 0 764 627 A1 (also Japanese Patent Application JP 244196/95) describe yet another system for recovery of acetic acid from aqueous streams in a terephthalic acid manufacturing process. In this process there is an additional liquid-liquid extraction column to process terephthalic acid mother liquor using an extraction solvent recovered from the azeotropic distillation column. The organic extract is then sent directly to the azeotropic distillation column and the aqueous raffinate to a wastewater treatment plant.

However, the process with each of these [three] approaches still requires considerable amounts of energy.

To further reduce energy consumption in recovery of acetic acid from such streams, Jang et al. in our co-pending U.S. patent application Ser. No. 12/382,801 (2009), describe a system and method for acetic acid dehydration in which there is a liquid-liquid extraction column to which water-rich feed streams are fed, having a guard bed situated near the top within the extraction column for conversion by reaction with acetic acid of alcohol within the mixture to the corresponding ester; and an azeotropic distillation column to remove residual water from acetic acid, to which water-poor feed streams are fed directly at a height of the azeotropic distillation column at which the mixture therein has a similar water concentration. The liquid-liquid extraction column produces an extract comprising an extraction solvent and acetic acid which is sent to the azeotropic distillation column to remove residual water. The acetic acid from the bottom of the azeotropic distillation column is sufficiently pure for reuse in the oxidation reactor and the water after stripping of the solvent is sent to wastewater treatment.

Nevertheless, even with these recent improvements, there is still a requirement for large amount of fresh process water, about 2.1 tonne make up water per 1 tonne pure terephthalic acid production. As a result, a considerable quantity of wastewater is discharged.

Accordingly, it is desirable to further improve the above processes, and thereby effect a reduction in consumption of energy and water, reduction in loss of organic materials, and reduction in aqueous effluent, which the present invention addresses.

SUMMARY OF THE INVENTION

The present invention comprises an apparatus and method for an improved process for recovery of acetic acid and reaction by-products such as p-toluic acid, and for the reduction or purification of pure water make-up in the hydrogenation reaction section e.g. in the manufacture of terephthalic acid by oxidation of p-xylene.

In contrast to prior art systems, the present invention recovers reaction intermediate organics and eliminates the make up water.

Novel features of the apparatus according to the invention include the inclusion of a solvent stripper and a pair of mother liquor extraction columns sequentially connected in series.

The solvent stripper receives the aqueous raffinate stream from the mother liquor extractor. Its primary function is to recover the extraction solvent and other organics from water by distillation. There are two output streams from this additional stripper: a volatiles stream comprising solvent and organics for recycle, additional to those from the separation columns, and an aqueous stream comprising water sufficiently pure for recycle and reuse in the hydrogenation section, for example in the filter of the terephthalic acid purification and recovery processes The present invention can also be used to adapt several prior art apparatus for recovery of acetic acid from aqueous streams. In particular, it is highly suitable for use with the components of the apparatus described by Jang et al. in our co-pending U.S. patent application Ser. No. 12/382,801 (2009), the Disclosure of which is incorporated herein by reference.

According to one aspect of the present invention we provide a process for recovering acetic acid, azeotropic agent, re-usable water and other reaction products such as p-toluic acid, from aqueous streams generated during terephthalic acid production, in which there is no requirement for make up water for the process and the amount of wastewater discharged is minimized;

the process comprising:
(a) providing an apparatus, comprising an azeotropic distillation column;
a decanter;
an azeotropic agent stripper;
a pair of mother liquor extraction columns sequentially connected in series; and
a solvent stripper;
(b) feeding to the azeotropic distillation column, a liquid acetic acid containing input stream containing organics and water, and optionally a acetic acid-containing vapor stream;
(c) recovering acetic acid as bottoms stream from the azeotropic distillation column;
(d) condensation of a tops volatiles stream from the azeotropic distillation column and separation in the decanter into an aqueous phase and an organics stream that is rich in azeotropic agent;
(e) splitting the organics stream from the decanter into a stream which is returned to the azeotropic distillation column and a stream which is fed to the second of the pair of mother liquor extraction columns;
(f) sending the water phase from the decanter to the azeotropic agent stripper for further recovery of the azeotropic agent;
(g) feeding to the first of the pair of mother liquor extraction columns, a p-toluic acid containing mother liquor stream and a solvent stream e.g. of substantially pure p-xylene, to form an organics extract stream containing primarily the solvent e.g. p-xylene with extracted p-toluic acid, and sending the recovered organics stream to an oxidation reactor for re-use in the terephthalic acid purification process;
(h) feeding to the second of the pair of mother liquor extraction columns, the water stream from the first of the pair of mother liquor extraction columns and the azeotropic rich organics stream;
(i) returning the recovered organics stream from the second of the pair of mother liquor extraction columns to the azeotropic distillation column;
(j) sending the recovered aqueous stream from the second of the pair of mother liquor extraction columns to the solvent stripper for recovery of azeotropic agent as tops stream which is sent to the decanter while substantially pure water stream from bottom of the solvent stripper is re-cycled to the terephthalic production process for re-use; and
(k) recovering a water stream from the azeotropic agent stripper for re-use in the terephthalic acid purification process.

According to another embodiment of this aspect of the present invention we provide a process for recovering acetic acid, extraction agent, azeotropic agent, re-usable water and other reaction products such as p-toluic acid, from aqueous streams generated during terephthalic acid production, in which there is no requirement for make up water for the process and the amount of wastewater discharged is minimized;

the process comprising:
(a) providing an apparatus, comprising an azeotropic distillation column;
a decanter;
an azeotropic agent stripper;
a liquid/liquid extraction column;
a pair of mother liquor extraction columns sequentially connected in series; and
a solvent stripper;
(b) feeding to the liquid-liquid extraction column, a liquid acetic acid containing input stream containing organics and water, and feeding a volatile tops stream from the first liquid-liquid extraction column to the azeotropic distillation column;
(c) recovering acetic acid as bottoms stream from the azeotropic distillation column;
(d) condensation of a tops volatiles stream from the azeotropic distillation column and separation in the decanter into an aqueous phase and an organics stream that is rich in azeotropic agent and splitting the organics stream into a stream that is sent to the azeotropic distillation column, a stream that is sent to the second of the pair of mother liquor extraction columns and a stream that s sent to the liquid-liquid extraction column;
(e) return of the organics stream from the decanter to the azeotropic distillation column;
(f) sending the water phase from the decanter to the azeotropic agent stripper for further recovery of the azeotropic agent;

(g) recovery of extraction agent in a bottoms aqueous stream from the first liquid-liquid extraction column and sending it to the azeotropic agent stripper;
(h) feeding to the first of the pair of mother liquor extraction columns, a p-toluic acid containing mother liquor stream and a solvent stream e.g. of substantially pure p-xylene, to form an organics extract stream containing primarily the solvent e.g. p-xylene with extracted p-toluic acid and sending the recovered organics stream to an oxidation reactor for re-use in the terephthalic acid purification process;
(i) feeding to the second of the pair of mother liquor extraction columns, the water stream from the first of the pair of mother liquor extraction columns and the azeotropic rich organics stream;
(j) returning the recovered organics stream from the second of the mother liquor extraction columns to the liquid-liquid extractor;
(k) sending the recovered aqueous stream from the second of the pair of mother liquor extraction column to the solvent stripper for recovery of azeotropic agent as tops stream which is sent to the decanter, while substantially pure water stream from bottom of the solvent stripper is re-cycled to the terephthalic production process for re-use; and
(l) recovering a water stream from the azeotropic agent stripper for re-use in the terephthalic acid purification process.

According to another aspect of the present invention we provide an apparatus for recovering acetic acid, azeotropic agent, re-usable water and other reaction products such as p-toluic acid, from aqueous streams generated during terephthalic acid production, in which there is no requirement for make up water for the process and the amount of wastewater discharged is minimized; comprising
1.
  an azeotropic distillation column for separation of acetic acid by removal of water as an azeotrope with an azeotropic agent,
  a decanter for separation of an aqueous phase and an organic phase rich in azeotropic agent, after condensation of the volatiles from the azeotropic distillation column,
  a distillation column that is an azeotropic agent stripper for recovery of azeotropic agent by distillation of the aqueous phase from the decanter,
  a pair of mother liquor extraction columns sequentially connected in series, for recovery of organics from aqueous terephthalic acid mother liquor, and
  a solvent stripper to remove azeotropic agent from the aqueous bottoms stream from the second of the pair of mother liquor extraction columns and thereby generate a stream that is substantially clean water for reuse.

According to an embodiment of this aspect of the present invention, we provide an apparatus for recovering acetic acid, extraction agent, azeotropic agent, re-usable water and other reaction products such as p-toluic acid, comprising
  an azeotropic distillation column for separation of acetic acid by removal of water as an azeotrope with an azeotropic agent,
  a decanter for separation of an aqueous phase and an organic phase rich in azeotropic agent, after condensation of the volatiles from the azeotropic distillation column,
  a distillation column that is an azeotropic agent stripper for recovery of azeotropic agent by distillation of the aqueous phase from the decanter,
  a liquid-liquid extraction column for separation of acetic acid from aqueous input streams of various acetic acid concentrations, using the azeotropic agent as an extraction agent,
  a pair of mother liquor extraction columns for recovery of organics from aqueous terephthalic acid mother liquor, and
  a solvent stripper to remove azeotropic agent from the aqueous bottoms stream from the second of the pair of mother liquor extraction columns and thereby generate a stream that is substantially clean water for reuse.

Further, the distillation system and process described herein are also compatible with other existing terephthalic acid manufacturing systems so that the invention may be readily installed to enhance existing plants without large capital expenditures.

These and other goals and embodiments of the invention will be better appreciated and understood when considered in conjunction with the following description and the accompanying drawings. It should be understood, however, that the following description, while indicating a particular embodiment of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

FIG. 4 is a process flow diagram that illustrates the process arrangement of the present invention for recovery of both acetic acid and p-toluic acid and for the reduction or purification of pure water make-up in the hydrogenation section in the manufacture of terephthalic acid by oxidation of p-xylene.

FIG. 5 is another process flow arrangement that illustrates the process flow of the present invention for recovery of both acetic acid and p-toluic acid and for the reduction or purification of pure water make-up in the hydrogenation section in the manufacture of terephthalic acid by oxidation of p-xylene.

DETAILED DESCRIPTION OF THE INVENTION

Figure 2:
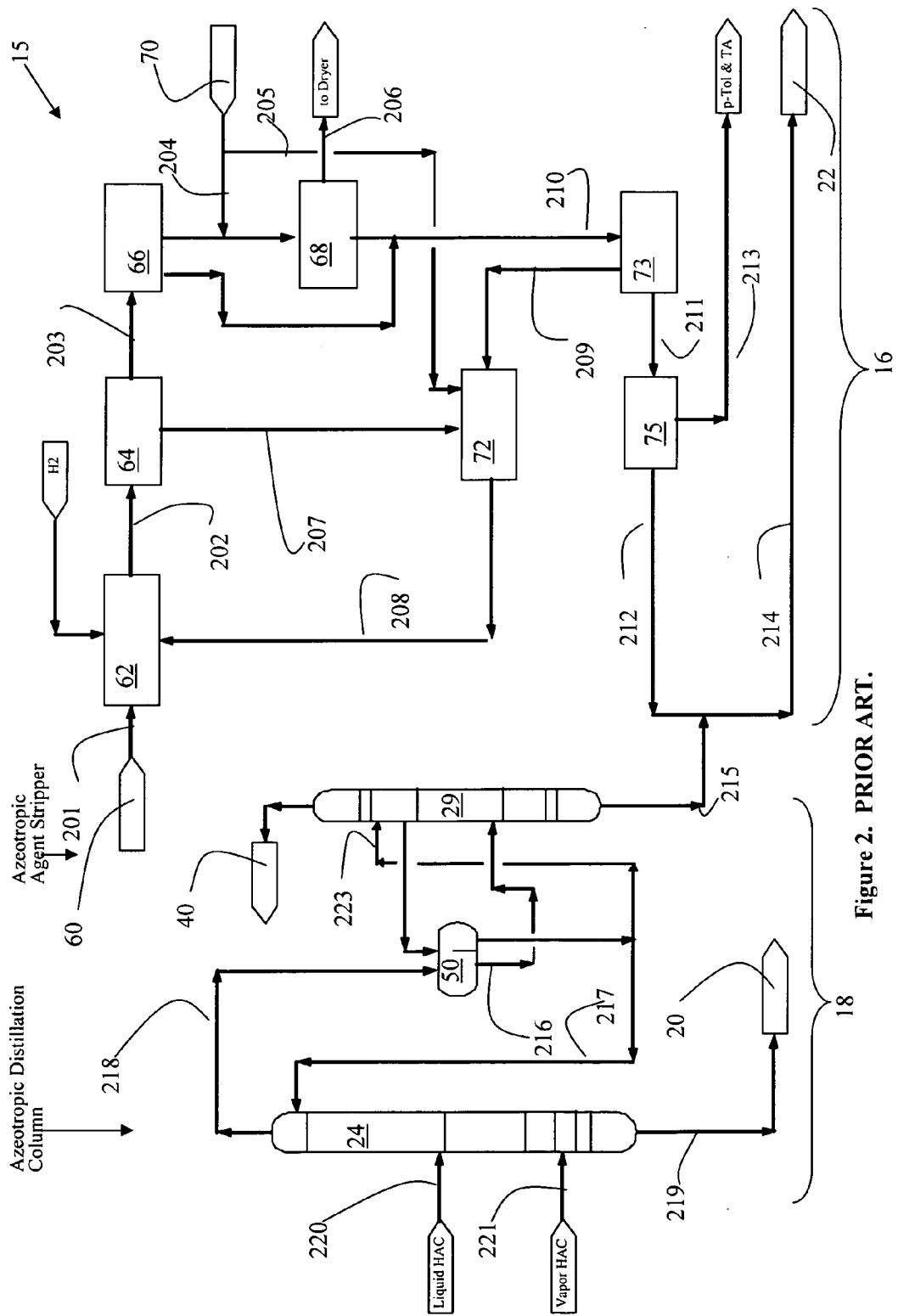
FIG. 2 is a process flow diagram illustrating a typical PRIOR ART apparatus for recovery of acetic acid from aqueous streams used in the manufacture and purification of terephthalic acid by oxidation of p-xylene.

Terephthalic acid typically is produced by reaction of para-xylene with molecular oxygen in the presence of catalysts, with a dehydration system such as, for purpose of illustration, those described by Jang et al. in FIG. 2 in U.S. Pat. No. 7,048,835 B2 (2006), and the process described by Ohkoshi et al. in Japanese Patent Application JP 244196/95 (1995) and European Patent Application EP 0 764 627 (1996). There are several other different examples of such dehydration processes, the essential components of which may be common to different manufacturing plants. During the production process for making terephthalic acid, acetic acid is used as a solvent of terephthalic acid. The acetic acid becomes diluted in water generated during the oxidation in a reactor of the terephthalic acid plant. A portion of the resulting aqueous acetic acid stream is then sent to the dehydration unit to remove the water. The dehydrated acetic acid is recycled for reuse and the water is sent for wastewater treatment.

Figure 1:
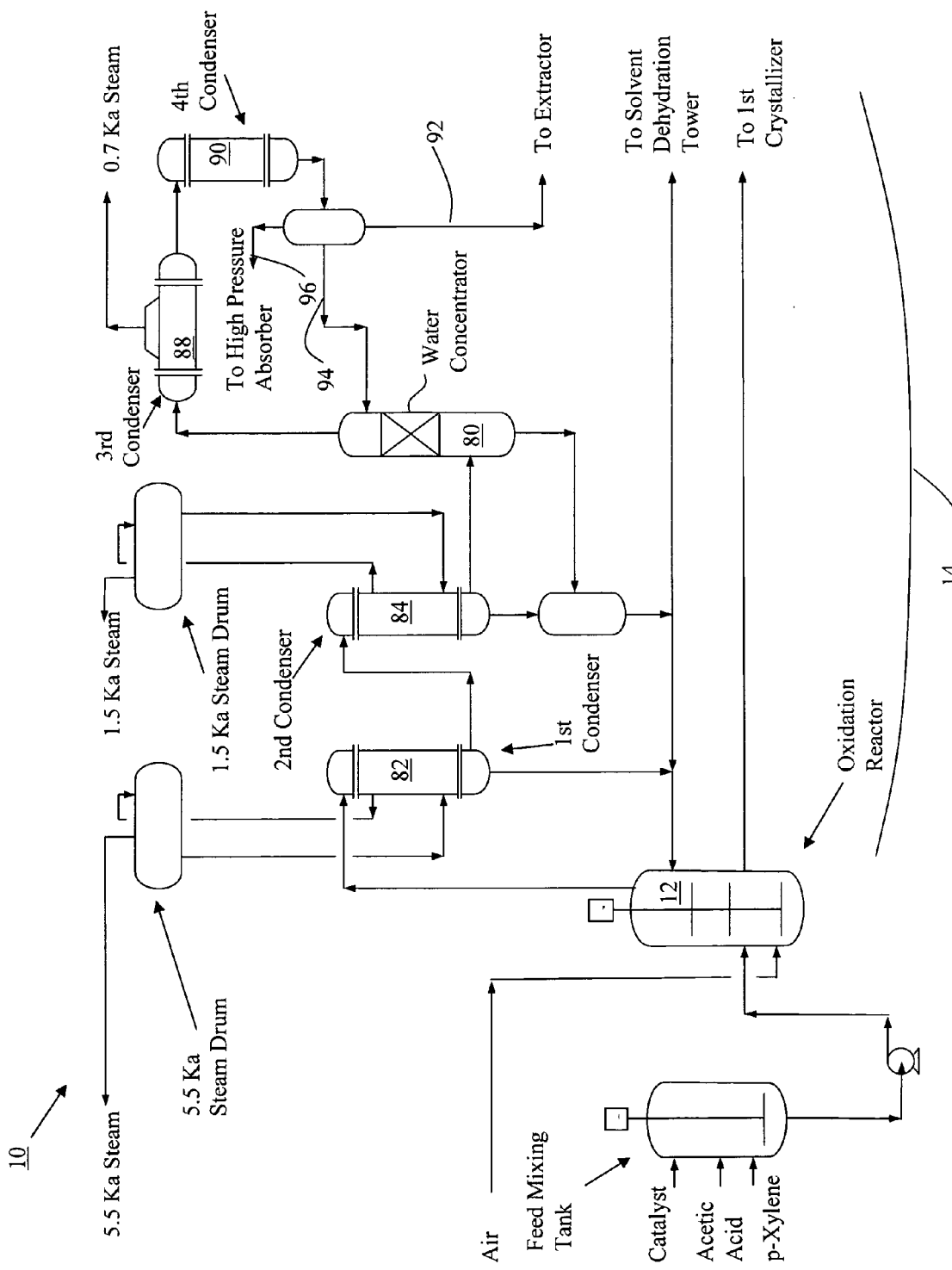
FIG. 1 is a process flow diagram illustrating a PRIOR ART apparatus for manufacture of terephthalic acid by oxidation of p-xylene.

Referring to FIG. 1, industrial chemicals such as terephthalic acid are produced in a manufacturing plant 10 having an oxidation apparatus 12 and the acetic acid is recovered during multiple condensing stages where aqueous acetic acid solution with various compositions are separated in an apparatus 14.

Figure 3:
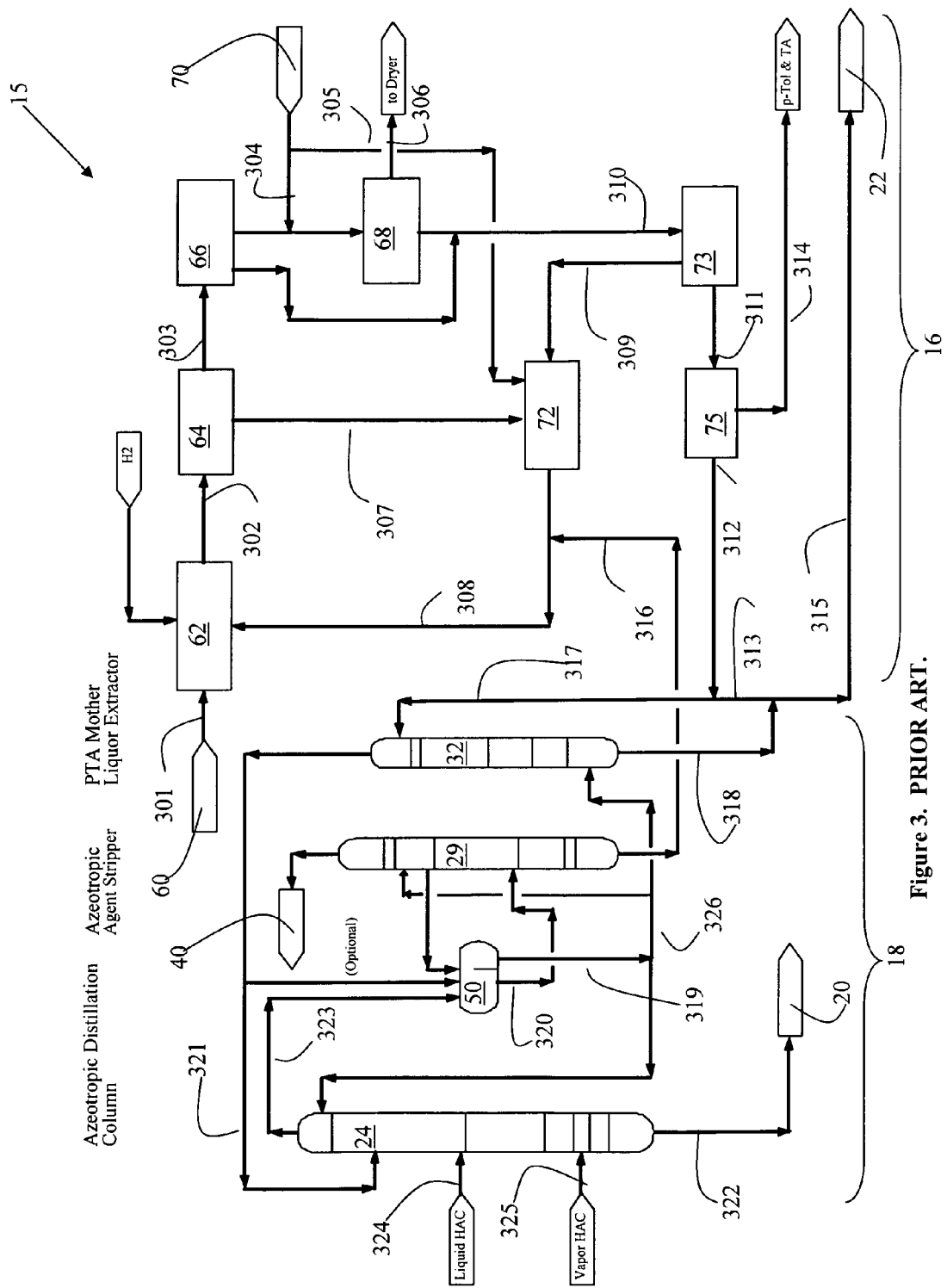
FIG. 3, labeled PRIOR ART, is a process flow diagram for a second process according to Ohkoshi et al. for recovery of p-toluic acid in the mother liquor from the hydrogenation reactor in the manufacture of terephthalic acid.

Referring to two prior art examples shown respectively in FIGS. 2 and 3, additional apparatus 15 is used for hydrogenation and purification of terephthalic acid in a section 16, and for dehydration to recover acetic acid for recycle in another section 18. The section 16 is a series of components for crude terephthalic acid hydrogenation, crystallization and filtration to produce purified terephalic acid (PTA) for the manufacturing plant. In section 18, acetic acid 20 is recovered for recycle to oxidation apparatus 12 in FIG. 1, and water is separated for discharge as wastewater 22.

The efficiency of the overall manufacturing and separation process depends on minimizing the costs of materials and consumption of energy. To this end, it is necessary to recover acetic acid from oxidation section 12 for reuse in the manufacture of crude terephthalic acid. It is also desirable to minimize the amount of make up water 70 required for the process, particularly in the hydrogenation section 16, and to reduce the expenditures for processing wastewater 22.

Crude terephthalic acid 60 is sent to hydrogenation reactor 62 and then crystallization unit 64 shown in FIG. 2. A terephthalic acid slurry 203 is then sent to a centrifuge 66 and a vacuum filter 68. Make up water 70 is required for washing terephthalic acid at vacuum filter 68. The washed (purified) terephthalic acid is sent to a dryer via 206 and the mother liquor from vacuum filter 68 is sent to vacuum flash drum 73 and then filtered in filter 75 to separate p-toluic acid and other organics in slurry 213 from mother liquor water 212.

Referring to FIG. 2, a typical prior art process for recovery of acetic acid 20 from an aqueous acetic acid containing feed stream 220 and a vapor acetic acid containing feed stream 221 includes an azeotropic distillation column 24 and an azeotropic agent stripper 29. Acetic acid 20 is recovered as bottoms stream 219 from azeotropic distillation column 24. A vapor stream 218 is condensed and separated in a decanter 50 into a water phase stream 216 and an organics stream 217 that is rich in azeotropic agent. A portion of azeotropic agent from decanter 50 is returned to azeotropic distillation column 24 as reflux. The balance of the azeotropic agent 222, and the water phase 217 are sent to azeotropic agent stripper 29 for the recovery of reaction by-product methyl acetate 40 and for further recovery of azeotropic agent 223. An exemplary process for production of terephthalic acid is described by Jang et al., U.S. Pat. No. 7,048,835 B2 (2006). Referring to FIG. 3, a modified prior art process includes, in addition to the features shown in FIG. 2, a pure terephthalic acid mother liquor liquid-liquid extraction column 32. An organics stream 321 is recovered from column 32 and sent to azeotropic distillation column 24. An aqueous raffinate stream 318 is discharged as wastewater 22 to a wastewater treatment plant (not illustrated).

Considerable amounts of make up water 70 are supplied in the hydrogenation sections shown in FIGS. 2 and 3 (see also Table 1). Eventually large quantities of wastewater 22 are discharged to a treatment plant for destruction or removal of impurities before release of the water to the environment. Thus there are large energy requirements in addition to the need for make up water 70.

While it is possible to use azeotropic distillation column 24 alone to partly separate water and acetic acid, for example by use of methyl acetate to form an ester-water azeotrope, this method is less efficient than is desirable. What is needed is a method for recovery of acetic acid 20 from aqueous streams 324, 325 that also includes recovery of water for use elsewhere in terephthalic acid manufacturing plant 10, in particular the terephthalic acid hydrogenation section 16, thereby reducing the requirement for make up water 70, and production of less waste and unwanted byproducts than prior art systems. Preferably, the system and process should be compatible with existing terephthalic acid manufacturing systems so that it may be readily installed to enhance or adapt existing plants without large capital expenditures.

To these ends, the present invention is a new apparatus and process (FIG. 4) that has been developed that has been found to be more water efficient than prior art systems (FIGS. 2 and 3). The new apparatus is also suitable for improvement of operation of several other types of apparatus and process for manufacture of terephthalic acid and recovery and recycle of both acetic acid and water therefrom. In particular, it is most suitable for improvement of the apparatus and process described by Jang et al. in our co-pending U.S. patent application Ser. No. 12/382,801 (2009), and so includes by Incorporation by Reference the option of inclusion of three innovative features therein that may be used individually or, most advantageously, in combination, together with the present invention: That is, (1) capability to pre-concentrate aqueous acetic acid streams before feeding to a liquid-liquid extractor and an azeotropic dehydration column, thus improving separation efficiency; (2) feeding of a plurality of streams having different water concentrations to different feed points of both a liquid-liquid extractor and an azeotropic distillation column, thus reducing overall energy consumption; and (3) inclusion of an esterification catalyst guard bed within an extraction column so as to convert alcohol to ester and water, thus reducing the amount of alcohol detrimentally circulating within the system. In contrast to prior art systems, the water produced by the esterification reaction in the present invention can be reused.

Referring now to the example shown in FIG. 3, [prior art] extraction-azeotropic distillation systems for recovery of acetic acid from aqueous solutions from terephthalic acid plants include mother liquor extraction column 32 and azeotropic distillation column 24. Aqueous mother liquor 312 from hydrogenation section, containing primarily water with small amounts of dissolved reaction by-product organics such as p-toluic acid and benzoic acid (882 ppm and 125 ppm, respectively, cited by Ohkoshi et al.), is fed into extraction column 32 at a site close to the top of said column 32. At least one stream 326 feeds extraction solvent near the bottom of extraction column 32 so that extraction solvent 326 and at least one aqueous feed stream 317 are in intimate contact as they move in a counter-current manner through said column 32. Ohkoshi et al. in Japanese Patent Application JP 244196/95 (1995) has claimed that normal butyl acetate is effective as the extraction solvent for extracting the p-toluic acid and benzoic acid in its extraction process. Extraction solvent 326 is recoverable during further processing for reuse in extraction column 32.

The p-toluic acid and other organics are extracted from feed stream 317 into extraction solvent 326, thus greatly depleting the concentration of organics, p-toluic acid in particular, in the aqueous component of the mixture in the bottom of extraction column 32. In the Ohkoshi design, the organic-depleted aqueous stream 318 exits the bottom of extraction column 32 for further treatment before disposal without recycle. The resulting mixture stream 321 containing extraction solvent 326 and p-toluic acid and other organic by-products exit the top of extraction column 32 and toward azeotropic distillation column 24.

Solution stream 321 is fed into an azeotropic distillation column 24 where it is distilled to separate the majority of the remaining water from the extracted organics. Extraction solvent 326 forms an azeotropic mixture with water so that said azeotropic mixture is distilled from the top of said column 24 as volatiles 323. Per Ohkoshi, normal butyl acetate is selected as the extraction solvent 326 which also serves to form the azeotrope with water in azeotropic distillation column 24. An acetic acid rich and water-poor liquid stream 322, containing the recovered p-toluic acid and other reaction by-products is recovered from the bottom of azeotropic distillation column 24 and recycled to oxidation section 10. The recovered p-toluic acid and other organic by-products from reaction effect increased terephthalic acid yield.

Azeotropic mixture 323 is condensed and forms two liquid phases which can be separated in a decanter 50 into a water-rich phase 320 which can be further treated before disposal, and a water-poor organic phase 319 comprising mostly extraction solvent, which can be recycled and reused in extraction column 32 and azeotropic distillation column 24.

As discussed above, deficiencies inherent in prior art acetic acid recovery processes have been addressed through incorporation of innovations in a process apparatus described and illustrated by Jang et al. in U.S. patent application Ser. No. 12/382,801 (2009). Among these, a guard bed is situated close to the top within the extraction column, containing an esterification catalyst over which acetic acid reacts with alcohol present in the reaction mixture to form the corresponding ester and water, as illustrated in Equation 1 for the case of normal butyl acetate. Said guard bed effects reduction of the amount of alcohol circulating in the system. Reaction 1 is accelerated by using an acidic catalyst such as alumina-HZSM5 or acidic forms of ion exchange resins, for example Amberlyst 36®.

$$n\text{-}C_4H_9OH + HOAc \leftrightarrow n\text{-}C_4H_9OAc + H_2O \tag{1}$$

Referring to the present invention, as illustrated in FIG. 4, it now has been found that use of an apparatus 100 according to the invention reduces the consumption energy required for separation of acetic acid from aqueous streams and water required in crude terephthalic acid hydrogenation section. Although the new apparatus and process include some components/features performing similar functions to similar components/features incorporated in the prior art, it will be clearly recognized by those skilled in the art, that the combination of such components/features with several new components/features not found in the prior art, such as the solvent stripper 102 and the pair of mother liquor extraction columns 105, 106 sequentially connected in series to achieve both water reduction and energy savings, is both novel and inventive. It is noted that the pair of mother liquor extractors 105, 106 is quite different in both structure and function from the mother liquor extractor 32 in the FIG. 3 prior art.

As seen in FIG. 4, the new apparatus comprises azeotropic distillation column 24 and liquid-liquid extraction column 107 for extracting acetic acid, included in dehydration section 18 of apparatus 100. Also included are a solvent stripping distillation column 102 for recovery of azeotropic agent 423, a pure terephthalic acid mother liquor extractor in the form of a pair of mother liquor extractors 105 and 106 sequentially connected in series, and azeotropic agent stripper 29 for separation of residual azeotropic agent from water streams 418 and 420. A decanter 50 is also provided.

Mother liquor stream 413 containing primarily water and small amounts, typically 500-1000 ppm of p-toluic acid and other organic reaction by-products from filter 75 (which is part of the terephthalic acid production apparatus), is fed near the top of mother liquor extractor column 105. The pure p-Xylene stream 433 which is normally fed to the oxidation reactor 12 as oxidation feedstock in FIG. 1, is fed to near the bottom of column 105. These two streams flow in counter-current fashion and organics including p-toluic acid and p-xylene are extracted from stream 413 to form an organics extract stream 434. The extract stream 434 containing primarily p-xylene with extracted p-toluic acid is then fed to the oxidation reactor 12 (of the terephthalic acid production apparatus). The water stream 435 from bottom of the extractor column 105 is fed to near the top of the extractor column 106.

It is also contemplated that if the production process involved is for making IPA, the solvent used would be m-xylene.

The organics stream 436 (a portion of stream 419 from the decanter 50), rich in azeotropic agent is fed near the bottom of column 106. These two streams 435 and 436 flow in counter-current fashion and the organics including p-toluic acid that was not extracted in extractor 105 remaining in the water stream 435 are extracted by organic stream 436 to form an organics extract stream 421. The water stream 431 from bottom of extractor 106 is fed to solvent stripper 102 to recover dissolved organics from top of the stripper 102 as stream 423. Water stream 424 from the bottom of the solvent stripper 102 is depleted in organics and can be recycled to rotary filter 168 (in the terephthalic acid production apparatus) and reused as illustrated for the current invention in FIG. 4.

Referring again to FIG. 4, the organics extract stream 421 is sent from extractor column 106 to acetic acid extractor 107 upstream of azeotropic distillation column 24. A portion of water stream 432 from azeotropic agent stripper 29 is recycled as stream 425 (2 T/h) to rotary filter 168, another portion is recycled as stream 405 (12 T/h) to the mother liquor tank 72, and the remaining portion is stream 415 (18 T/h) discharged as wastewater 22. The upper output stream from the solvent stripper 29 containing the recovered solvent is sent to the decanter 50.

Distillation column 102 is for separation of a water rich bottom stream 431 from the bottom of mother liquor extraction column 106. A volatiles stream 423 exits from the top of column 102. Volatiles stream 423 comprises mainly organics and approximately 3% of the water initially in feed stream 431. A stream 424 comprising the majority of the water initially in feed stream 431 exits the bottom of column 102. Volatiles stream 423 is returned as condensate to decanter 50 where it is separated into aqueous phase stream 420 and organics phase stream 419 rich in extraction solvent. Liquids stream 424 is sufficiently clean water that it can be recycled with water stream 425 as recovered water stream 422 without further treatment for use in the crude terephthalic acid hydrogenation section 16 of apparatus 100. Extraction solvent recovered from volatiles stream 423 is recycled for use in azeotropic distillation column 24.

Another arrangement of the present invention, also illustrated in FIG. 5, the new apparatus comprises azeotropic distillation column 24, but without the liquid-liquid extraction column 107 for extracting acetic acid, included in dehydration section 18 of apparatus 100. Also included are a solvent stripping distillation column 102 for recovery of azeotropic agent 523, a pure terephthalic acid mother liquor extractor in the form of a pair of mother liquor extractors 105 and 106 sequentially connected in series, and azeotropic agent stripper 29 for separation of residual azeotropic agent from water stream 520. A decanter 50 is also provided.

Mother liquor stream 513 containing primarily water and small amounts, typically 500-1000 ppm of p-toluic acid and other organic reaction by-products from filter 75 (which is part of the terephthalic acid production apparatus), is fed near the top of mother liquor extractor column 105. The pure p-Xylene stream 533 which is normally fed to the oxidation reactor 12 as oxidation feedstock in FIG. 1, is fed to near the bottom of column 105. These two streams flow in counter-current fashion and organics including p-toluic acid and p-xylene are extracted from stream 513 to form an organics extract stream 534. The extract stream 534 containing primarily p-xylene with extracted p-toluic acid is then fed to the oxidation reactor 12 (of the terephthalic acid production apparatus). The water stream 535 from bottom of the extractor column 105 is fed to near the top of the extractor column 106.

It is also contemplated that if the production process involved is for making IPA, the solvent used would be m-xylene.

The organics stream 536 (a portion of stream 519 from the decanter 50), rich in azeotropic agent is fed near the bottom of column 106. These two streams 535 and 536 flow in countercurrent fashion and the organics including p-toluic acid that was not extracted in extractor 105 remaining in the water stream 535 are extracted by organic stream 536 to form an organics extract stream 521. The water stream 531 from bottom of extractor 106 is fed to solvent stripper 102 to recover dissolved organics from top of the stripper 102 as stream 523. Water stream 524 from the bottom of the solvent stripper 102 is depleted in organics and can be recycled to rotary filter 168 (in the terephthalic acid production apparatus) and reused as illustrated for the current invention in FIG. 5.

Referring again to FIG. 5, the organics extract stream 521 is sent from extractor column 106 to azeotropic distillation column 24. A portion of water stream 532 from azeotropic agent stripper 29 is recycled as stream 525 (2 T/h) to rotary filter 168, another portion is recycled as stream 505 (12 T/h) to the mother liquor tank 72, and the remaining portion is stream 515 (18 T/h) discharged as wastewater 22. The upper output stream from the solvent stripper 29 containing the recovered solvent is sent to the decanter 50.

Distillation column 102 is for separation of a water rich bottom stream 531 from the bottom of mother liquor extraction column 106. A volatiles stream 523 exits from the top of column 102. Volatiles stream 523 comprises mainly organics and approximately 3% of the water initially in feed stream 531. A stream 524 comprising the majority of the water initially in feed stream 531 exits the bottom of column 102. Volatiles stream 523 is returned as condensate to decanter 50 where it is separated into aqueous phase stream 520 and organics phase stream 519 rich in extraction solvent. Liquids stream 524 is sufficiently clean water that it can be recycled with water stream 525 as recovered water stream 522 without further treatment for use in the crude terephthalic acid hydrogenation section 16 of apparatus 100. Extraction solvent recovered from volatiles stream 523 is recycled for use in azeotropic distillation column 24.

The following Table 1 lists the water input and output from processes for manufacture of 120 tonne per hour terephthalic acid with recovery of acetic acid. For purposes of example and for more detailed comparison of the present invention with the prior art, the natures and contents of the various streams within the different processes are presented as EXAMPLES, below.

The outputs from the azeotropic distillation column 24, include a tops stream 428 containing volatiles, which is fed to the decanter 50, and a bottoms stream 427 containing substantially pure acetic acid which is recovered for re-cycle.

TABLE 1

Comparison of water supplied and water discharged from prior art acetic acid recovery systems and the present inventions.

| Process: | Typical prior art (FIG. 2) | Modified prior art (Ohkishi et al; FIG. 3) | Present invention (FIG. 4 & FIG. 5) |
|---|---|---|---|
| | Water input and output: | | |
| Make up water | 260 tonne per hour | 230 tonne per hour | None |
| To wastewater | 278 tonne per hour | 248 tonne per hour | 18 tonne per hour |
| To terephthalic acid dryer | 10 tonne per hour | 10 tonne per hour | 10 tonne per hour |

By comparison of the data for FIGS. 2 and 3 with FIG. 4, it can be seen that apparatus 100 differs significantly from apparatus 15 of the prior art, and Table 1 shows the resulting benefits. There is consequential reduction in the amount of organic material for disposal or destruction. Also, there is recovery and recycle of water for use in section 16, with the beneficial consequences that no make up water is required for the manufacturing process and there is a much lower amount of wastewater discarded (18 tonne per hour compared to 260-290 tonne per hour wastewater for production of 120 tonne per hour terephthalic acid), as shown in Table 1. It has been found that these features also confer a net reduction in costs, including less energy consumption, for the overall process comprising manufacture of terephthalic acid, processing of crude product and recovery of pure terephthalic acid and its organic by-products, recovery and recycle of acetic acid, and disposal of wastewater. Thus it can be seen that the invention described herein provides economical and environmental benefits in the manufacture of terephthalic acid.

The foregoing description of the invention is presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

EXAMPLES

The following examples enable comparison of prior art and the present invention. In each case, the amounts of each component in each stream are for a plant manufacturing 120 tonne per hour terephthalic acid with recovery of acetic acid.

Details of the content of each stream for the different plants having the same output are listed in Table 2 for the typical prior art plant illustrated in FIG. 2, Table 3 for the modified prior art plant illustrated in FIG. 3, and Table 4 for the present invention, illustrated in FIG. 4. In each table, "TA" means terephthalic acid.

Example 1

TABLE 2

Content of various streams in a typical prior art acetic acid recovery system, illustrated in FIG. 2.

| Stream | Nature, Composition |
|---|---|
| 201. | TA: 120 T/h; 4-CBA: 2500 ppm. |
| 202. | TA: 120 T/h; $H_2O$: 280 T/h; p-Tol: 970 ppm. |
| 203. | Slurry, TA: 120 T/h; $H_2O$: 175 T/h; p-Tol: 1540 ppm. |
| 204. | $H_2O$: 100 T/h. |
| 205. | $H_2O$: 160 T/h. |
| 206. | TA: 120 T/h; $H_2O$: 10 T/h; p-Tol: <150 ppm. |
| 207. | Condensate, $H_2O$: 105 T/h; p-Tol: 30 ppm |
| 208. | Mother liquor, $H_2O$: 280 T/h; p-Tol: 10 ppm. |
| 209. | Condensate, $H_2O$: 15 T/h; p-Tol: 30 ppm. |
| 210. | Washed mother liquor, TA: 265 T/h; p-Tol: 980 ppm. |
| 211. | $H_2O$: 250 T/h; p-Tol: 1040 ppm. |
| 212. | Filtrate (Water & p-Tol), $H_2O$: 248 T/h; p-Tol: 650 ppm. |
| 213. | $H_2O$: 2 T/h; p-Tol: 49400 ppm. |
| 214. | $H_2O$: 278 T/h; p-Tol: 580 ppm. |
| 215. | Water, $H_2O$: 30 T/h. |
| 216. | Organic phase, primarily azeotropic agent. |
| 217. | Water phase. |
| 218. | Volatiles from azeotropic distillation column, $H_2O$ and azeotropic agent. |
| 219. | Product stream from azeotropic column, Acetic Acid. |
| 220. | Liquid aqueous acetic acid feed stream. |
| 221. | Vapor acetic acid containing feed stream. |

Example 2

TABLE 3

Content of various streams in the modified prior art acetic acid recovery system according to Ohkoshi et al., illustrated in FIG. 3.

| Stream | Nature, Composition |
|---|---|
| 301. | TA: 120 T/h; 4-CBA: 2500 ppm. |
| 302. | TA: 120 T/h; $H_2O$: 280 T/h; p-Tol: 970 ppm. |
| 303. | Slurry, TA: 120 T/h; $H_2O$: 175 T/h; p-Tol: 1540 ppm. |
| 304. | $H_2O$: 100 T/h. |
| 305. | H2O: 130 T/h. |
| 306. | A: 120 T/h; $H_2O$: 10 T/h; p-Tol: <150 ppm. |
| 307. | Condensate, $H_2O$: 105 T/h; p-Tol: 30 ppm |
| 308. | Mother liquor, $H_2O$: 280 T/h; p-Tol: 10 ppm. |
| 309. | Condensate, $H_2O$: 15 T/h; p-Tol: 30 ppm. |
| 310. | Washed mother liquor, TA: 265 T/h; p-Tol: 980 ppm. |
| 311. | $H_2O$: 250 T/h; p-Tol: 1040 ppm. |
| 312. | Filtrate (Water & p-Tol), $H_2O$: 248 T/h; p-Tol: 650 ppm. |
| 313. | $H_2O$: 148 T/h; p-Tol: 650 ppm. |
| 314. | $H_2O$: 2 T/h; p-Tol: 49400 ppm. |
| 315. | $H_2O$: 248 T/h; p-Tol: 400 ppm. |
| 316. | Water from azeotropic agent stripper, $H_2O$: 30 T/h. |
| 317. | $H_2O$: 100 T/h; p-Tol: 650 ppm. |
| 318. | Raffinate (water), $H_2O$: 100 T/h; p-Tol: <50 ppm. |
| 319. | Organic phase, primarily azeotropic agent. |
| 320. | Water phase. |
| 321. | Extract (Solvent, p-Tol & TA) |
| 322. | Product stream from azeotropic column, Acetic Acid. |
| 323. | Volatiles from azeotropic distillation column, $H_2O$ and azeotropic agent. |

TABLE 3-continued

Content of various streams in the modified prior art acetic acid recovery system according to Ohkoshi et al., illustrated in FIG. 3.

| Stream | Nature, Composition |
|---|---|
| 324. | Liquid aqueous acetic acid feed stream. |
| 325. | Vapor acetic acid containing feed stream. |
| 326. | Acetic acid containing feed to extractor. |

Example 3

TABLE 4

Content of various streams in the present process for recovery of acetic acid and water from aqueous streams, illustrated in FIG. 4.

| Stream | Nature, Composition |
|---|---|
| 401. | TA: 120 T/h; 4-CBA: 2500 ppm. |
| 402. | TA: 120 T/h; $H_2O$: 280 T/h; p-Tol: 1370 ppm. |
| 403. | Slurry, TA: 120 T/h; $H_2O$: 175 T/h; p-Tol: 2180 ppm. |
| 404. | TA: 147 T/h; p-Tol: 2180 ppm. |
| 405. | $H_2O$: 12 T/h. |
| 406. | TA: 120 T/h; $H_2O$: 10 T/h; p-Tol: <150 ppm. |
| 407. | Condensate, $H_2O$: 105 T/h; p-Tol: 30 ppm |
| 408. | Recovered mother liquor, $H_2O$: 280 T/h; p-Tol: 370 ppm. |
| 409. | Condensate, $H_2O$: 15 T/h; p-Tol: 30 ppm. |
| 410. | Washed mother liquor, TA: 78 T/h; p-Tol: 700 ppm. |
| 411. | $H_2O$: 132 T/h; p-Tol: 2420 ppm. |
| 412. | Filtrate, $H_2O$: 130 T/h; p-Tol: 650 ppm. |
| 413. | $H_2O$: 60 T/h; p-Tol: 650 ppm. |
| 414. | $H_2O$: 2 T/h; p-Tol: 12%. |
| 415. | $H_2O$: 18 T/h. |
| 416. | Water, $H_2O$: 14 T/h. |
| 417. | $H_2O$: 82 T/h; p-Tol: 650 ppm. |
| 418. | Raffinate (water). |
| 419. | Azeotropic agent. |
| 420. | Water phase. |
| 421. | Extract (Solvent, p-Tol & TA) |
| 422. | Recovered water. |
| 423. | Stripped organics, H2O: 2 T/h. |
| 424. | $H_2O$: 58 T/h; p-Tol 20 ppm. |
| 425. | $H_2O$: 2 T/h. |
| 426. | Extract from acetic acid column. |
| 427. | Product stream from azeotropic column, Acetic Acid. |
| 428. | Volatiles from azeotropic column. |
| 429. | Liquid aqueous feed stream containing acetic acid. |
| 430. | Vapor feed stream containing acetic acid. |
| 431. | Bottoms from the mother liquor extraction column, $H_2O$ and organics. |
| 432. | Water from azeotropic agent stripper, $H_2O$: 30 T/h. |
| 433. | p-Xylene Feed to $2^{nd}$ Extractor. |
| 434. | Extract from $2^{nd}$ Extractor. |
| 435. | Raffinate from $2^{nd}$ Extractor to $3^{rd}$ Extractor. |
| 436. | Azeotropic Agent to $3^{rd}$ Extractor. |

These results are summarized in Table 1

Example 4

It has now been found that substantially the same results as in Example 3 can be achieved by removing the liquid-liquid extraction column 107 from the apparatus. FIG. 5 illustrates this new embodiment of the invention. Note that the process streams for the new process are the same as in FIG. 4, except that they are numerated in the 500 series, instead of the 400 series. More specifically, the differences in the process include the inputting of the acetic acid containing liquid and gaseous streams 529 and 530, respectively, directly into the azeotropic distillation column 24. In addition, process stream 521 from the second of the pair of mother liquor extraction columns 106 is fed directly to the azeotropic distillation column 24. Also, part of the organics stream 519 from the decanter 50 is also fed to the azeotropic distillation column 24.

TABLE 5

Content of various streams in the present process for recovery of acetic acid and water from aqueous streams, illustrated in FIG. 5.

| Stream | Nature, Composition |
|---|---|
| 501. | TA: 120 T/h; 4-CBA: 2500 ppm. |
| 502. | TA: 120 T/h; $H_2O$: 280 T/h; p-Tol: 1370 ppm. |
| 503. | Slurry, TA: 120 T/h; $H_2O$: 175 T/h; p-Tol: 2180 ppm. |
| 504. | TA: 147 T/h; p-Tol: 2180 ppm. |
| 505. | $H_2O$: 12 T/h. |
| 506. | TA: 120 T/h; $H_2O$: 10 T/h; p-Tol: <150 ppm. |
| 507. | Condensate, $H_2O$: 105 T/h; p-Tol: 30 ppm |
| 508. | Recovered mother liquor, $H_2O$: 280 T/h; p-Tol: 370 ppm. |
| 509. | Condensate, $H_2O$: 15 T/h; p-Tol: 30 ppm. |
| 510. | Washed mother liquor, TA: 78 T/h; p-Tol: 700 ppm. |
| 511. | $H_2O$: 132 T/h; p-Tol: 2420 ppm. |
| 512. | Filtrate, $H_2O$: 130 T/h; p-Tol: 650 ppm. |
| 513. | $H_2O$: 60 T/h; p-Tol: 650 ppm. |
| 514. | $H_2O$: 2 T/h; p-Tol: 12%. |
| 515. | $H_2O$: 18 T/h. |
| 516. | Water, $H_2O$: 14 T/h. |
| 517. | $H_2O$: 82 T/h; p-Tol: 650 ppm. |
| 519. | Azeotropic agent. |
| 520. | Water phase. |
| 521. | Extract (Solvent, p-Tol & TA) |
| 522. | Recovered water. |
| 523. | Stripped organics, H2O: 2 T/h. |
| 524. | $H_2O$: 58 T/h; p-Tol 20 ppm. |
| 525. | $H_2O$: 2 T/h. |
| 527. | Product stream from azeotropic column, Acetic Acid. |
| 528. | Volatiles from azeotropic column. |
| 529. | Liquid aqueous feed stream containing acetic acid. |
| 530. | Vapor feed stream containing acetic acid. |
| 531. | Bottoms from the mother liquor extraction column, $H_2O$ and organics. |
| 532. | Water from azeotropic agent stripper, $H_2O$: 30 T/h. |
| 533. | p-Xylene Feed to $2^{nd}$ Extractor. |
| 534. | Extract from $2^{nd}$ Extractor. |
| 535. | Raffinate from $2^{nd}$ Extractor to $3^{rd}$ Extractor. |
| 536. | Azeotropic Agent to $3^{rd}$ Extractor. |

REFERENCES CITED

U.S. patent Documents

| 7,048,835 B2 | May 2006 | Jang et al. | 203/16 |
| 5,662,780 | September 1997 | Sasaki et al. | 203/81 |
| 2,395,010 | February 1946 | Othmer | 260-541 |

U.S. patent Applications

| PCT/US2006/036963 | September 2005 | Jang and Wu |
| 12/382,801 | March 2009 | Jang et al. |

Foreign Patents and Applications

| EP 0 764 627 A1 | March 1997 | Ohkoshi et al. (JP 244196/95 (1995)) |

What is claimed is:

1. A process for recovering acetic acid, azeotropic agent, re-usable water and other reaction products such as p-toluic acid, from aqueous streams generated during terephthalic acid production, in which there is no requirement for make up water for the process and the amount of wastewater discharged is minimized;
the process comprising:
(a) providing an apparatus, comprising an azeotropic distillation column;
a decanter;
an azeotropic agent stripper;
a pair of mother liquor extraction columns sequentially connected in series; and
a solvent stripper;
(b) feeding to the azeotropic distillation column, a liquid acetic acid containing input stream containing organics and water, and optionally a acetic acid-containing vapor stream;
(c) recovering acetic acid as bottoms stream from the azeotropic distillation column;
(d) condensation of a tops volatiles stream from the azeotropic distillation column and separation in the decanter into an aqueous phase and an organics stream that is rich in azeotropic agent;
(e) splitting the organics stream from the decanter into a stream which is returned to the azeotropic distillation column and a stream which is fed to the second of the pair of mother liquor extraction columns;
(f) sending the water phase from the decanter to the azeotropic agent stripper for further recovery of the azeotropic agent;
(g) feeding to the first of the pair of mother liquor extraction columns, a p-toluic acid containing mother liquor stream and a solvent stream e.g. of substantially pure p-xylene, to form an organics extract stream containing primarily the solvent e.g. p-xylene with extracted p-toluic acid, and sending the recovered organics stream to an oxidation reactor for re-use in the terephthalic acid purification process;
(h) feeding to the second of the pair of mother liquor extraction columns, the water stream from the first of the pair of mother liquor extraction columns and the azeotropic rich organics stream;
(i) returning the recovered organics stream from the second of the pair of mother liquor extraction columns to the azeotropic distillation column;
(j) sending the recovered aqueous stream from the second of the pair of mother liquor extraction columns to the solvent stripper for recovery of azeotropic agent as tops stream which is sent to the decanter while substantially pure water stream from bottom of the solvent stripper is re-cycled to the terephthalic production process for re-use; and
(k) recovering a water stream from the azeotropic agent stripper for re-use in the terephthalic acid purification process.

2. A process for recovering acetic acid, extraction agent, azeotropic agent, re-usable water and other reaction products such as p-toluic acid, from aqueous streams generated during terephthalic acid production, in which there is no requirement for make up water for the process and the amount of wastewater discharged is minimized;
the process comprising:
(a) providing an apparatus, comprising an azeotropic distillation column;
a decanter;
an azeotropic agent stripper;
a liquid/liquid extraction column;
a pair of mother liquor extraction columns sequentially connected in series; and
a solvent stripper;
(b) feeding to the liquid-liquid extraction column, a liquid acetic acid containing input stream containing organics and water, and feeding a volatile tops stream from the first liquid-liquid extraction column to the azeotropic distillation column;

(c) recovering acetic acid as bottoms stream from the azeotropic distillation column;

(d) condensation of a tops volatiles stream from the azeotropic distillation column and separation in the decanter into an aqueous phase and an organics stream that is rich in azeotropic agent and splitting the organics stream into a stream that is sent to the azeotropic distillation column, a stream that is sent to the second of the pair of mother liquor extraction columns and a stream that s sent to the liquid-liquid extraction column;

(e) return of the organics stream from the decanter to the azeotropic distillation column;

(f) sending the water phase from the decanter to the azeotropic agent stripper for further recovery of the azeotropic agent;

(g) recovery of extraction agent in a bottoms aqueous stream from the first liquid-liquid extraction column and sending it to the azeotropic agent stripper;

(h) feeding to the first of the pair of mother liquor extraction columns, a p-toluic acid containing mother liquor stream and a solvent stream e.g. of substantially pure p-xylene, to form an organics extract stream containing primarily the solvent e.g. p-xylene with extracted p-toluic acid and sending the recovered organics stream to an oxidation reactor for re-use in the terephthalic acid purification process;

(i) feeding to the second of the pair of mother liquor extraction columns, the water stream from the first of the pair of mother liquor extraction columns and the azeotropic rich organics stream;

(j) returning the recovered organics stream from the second of the mother liquor extraction columns to the liquid-liquid extractor;

(k) sending the recovered aqueous stream from the second of the pair of mother liquor extraction columns to the solvent stripper for recovery of azeotropic agent as tops stream which is sent to the decanter, while substantially pure water stream from bottom of the solvent stripper is re-cycled to the terephthalic production process for re-use; and (l) recovering a water stream from the azeotropic agent stripper for re-use in the terephthalic acid purification process.

3. The process according to claim 2, wherein the extraction solvent used in the liquid-liquid extraction column and in the first of the pair of mother liquor extraction columns is the azeotropic extraction agent, and wherein the extractant solvent is a lower-alkyl ester selected from the group consisting of isobutyl acetate, n-butyl acetate, isopropyl acetate and n-propyl acetate, and wherein the solvent used in the second of the pair of mother liquor extraction columns is p-xylene.

4. The process according to claim 2, wherein the extraction solvent used in the liquid-liquid extraction column and in the first of the pair of mother liquor extraction columns is the azeotropic distillation agent; and wherein the solvent used in the second of the pair of mother liquor extraction columns is m-xylene.

5. The process according to claim 1, wherein a portion of water stream from the azeotropic agent stripper is re-cycled for use in the terephthalic acid production process, another portion is re-cycled to a mother liquor source tank for use in the terephthalic acid production process and the remaining portion is discharged as wastewater.

6. The process according to claim 2, wherein a portion of water stream from the azeotropic agent stripper is re-cycled for use in the terephthalic acid production process, another portion is re-cycled to a mother liquor source tank for use in the terephthalic acid production process and the remaining portion is discharged as wastewater.

7. The process according to claim 1, wherein a vapour stream containing acetic acid is input into the azeotropic distillation column.

8. The process according to claim 2, wherein a vapour stream containing acetic acid is input into the azeotropic distillation column.

9. The process according to claim 1, wherein the liquid acetic acid containing input stream comprises a plurality of liquid streams containing different water concentrations, acetic acid and organics.

10. The process according to claim 2, wherein the liquid acetic acid containing input stream comprises a plurality of liquid streams containing different water concentrations, acetic acid and organics.

11. The process according to claim 9, wherein step (g), the process streams within the first of the pair of mother liquor extraction columns are flowed countercurrently within the column, and wherein step (h), the process streams within the second of the pair of mother liquor extraction columns are flowed countercurrently within the column.

12. The process according to claim 11, wherein the plurality of liquid streams are fed to different feed points of both the liquid-liquid extraction column and the azeotropic distillation column.

13. The process according to claim 12, comprising pre-concentrating the liquid streams before feeding to the liquid-liquid extraction column and azeotropic distillation column.

14. The process according to claim 13, wherein a guard bed is provided within and near the top of the liquid-liquid extraction column, containing an esterification catalyst, to convert alcohol to ester and water, and wherein the water is re-cycled for re-use.

15. The process according to claim 14, wherein the esterification catalyst is an acidic catalyst selected from the group consisting of acid forms of aluminosilicate and acid forms of ion exchange resins.

* * * * *